A. F. ROTH.
CLOSABLE VENTILATOR.
APPLICATION FILED SEPT. 16, 1920. RENEWED JAN. 20, 1922.
1,425,903.
Patented Aug. 15, 1922.
2 SHEETS—SHEET 2.
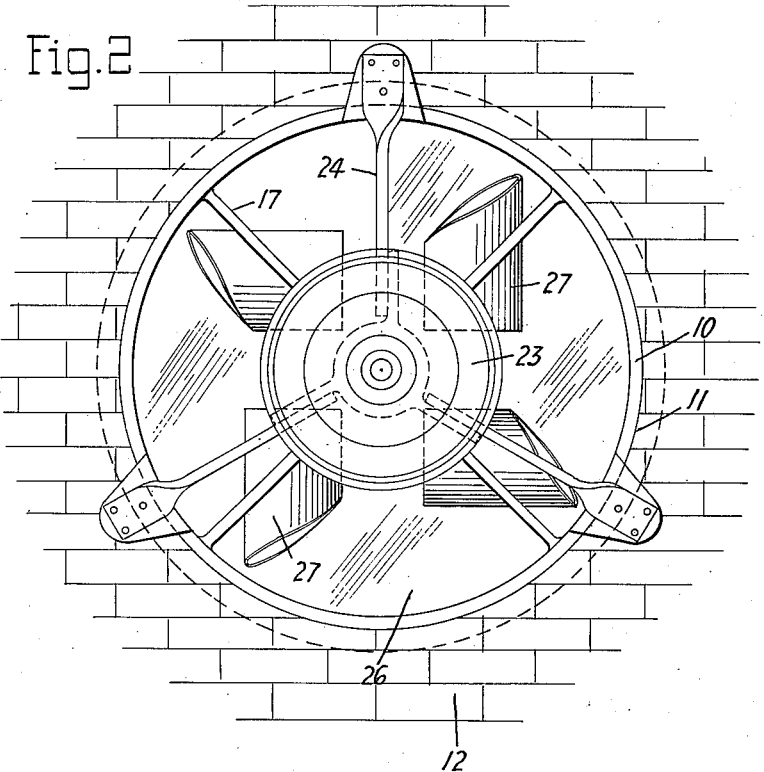
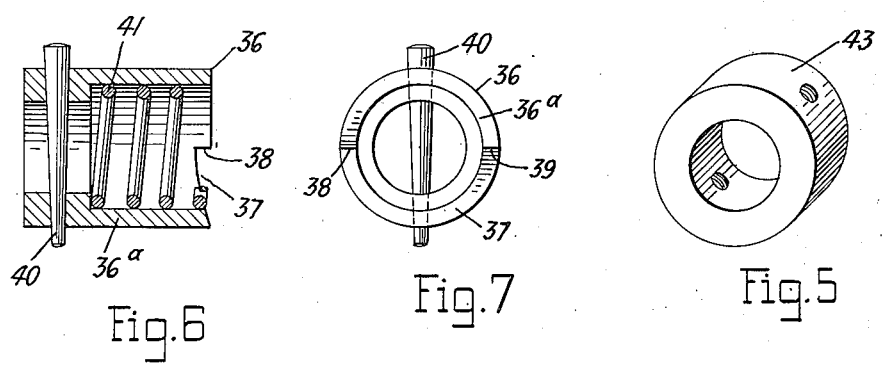
Inventor
Adolph F. Roth
By his Attorney
N. T. Criswell.

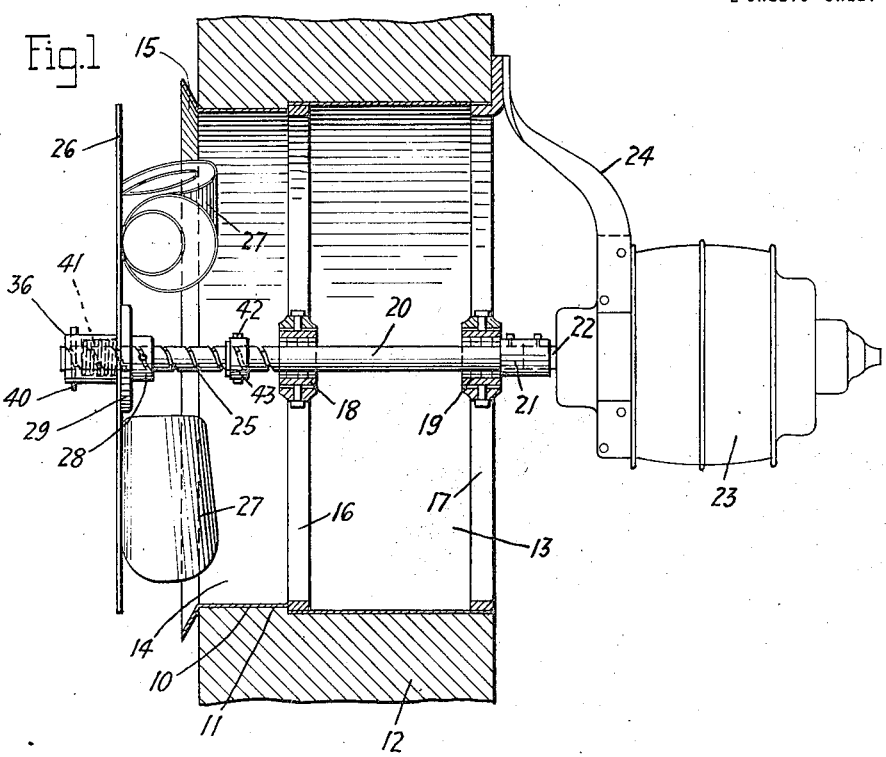
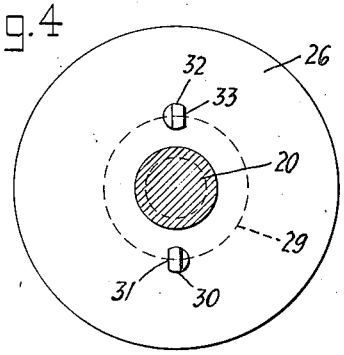
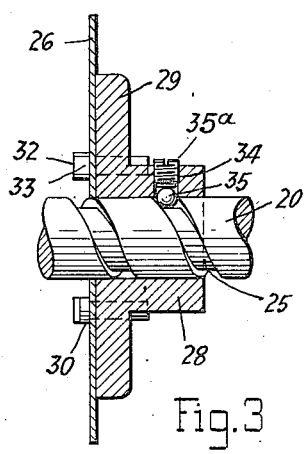

UNITED STATES PATENT OFFICE.

ADOLPH F. ROTH, OF NEWARK, NEW JERSEY.

CLOSABLE VENTILATOR.

1,425,903. Specification of Letters Patent. Patented Aug. 15, 1922.

Application filed September 16, 1920, Serial No. 410,694. Renewed January 20, 1922. Serial No. 530,727.

*To all whom it may concern:*

Be it known that I, ADOLPH F. ROTH, a citizen of the United States, and a resident of Newark, in the county of Essex and State of New Jersey, have invented certain new and useful Improvements in a Closable Ventilator, of which the following is a full, clear, and exact specification.

This invention relates more particularly to a class of ventilating apparatus.

My invention has for its object primarily to provide a ventilator designed to be employed especially for freeing the chambers of buildings, theaters, factories, mines, ships and elsewhere of atmosphere contaminated by excess of heat, smoke, steam, gas or acid fumes and other injurious foreign substances, and which is of a self-closable fan type driven by power so that when operated effectual ventilation will be accomplished and when stopped the outlet through which the foul atmospheric fluid is discharged will be closed to cut-off the ventilating process as well as closing the exhaust outlet of the chamber controlled by the device so that the fan will not be exposed to the outside weather when not in use, besides preventing rain, snow and wind from entering the chamber through the exhaust outlet. The ventilator is also of a form allowing of its employment at inaccessible places, because of being self-closable with the shutting-off of its power, thereby dispensing with the requirement of using special closing appliances as is incident to general types of ventilators where a cessation of the ventilation is desired.

The invention resides mainly in providing at the exhaust outlet of a casing having an inlet leading from a chamber of a power driven revolvable plate carrying fan blades adapted to suctionally force atmospheric fluid from the chamber for discharge through the outlet of the casing, and the plate is of a size suitable to close the inlet of the casing. The plate and fan blades are also slidably movable so that when driven the plate will be moved to open position from the outlet of the casing, and with the shutting-off of the power to stop rotation of the plate and fan blades the plate will be forced upon the casing to close its inlet with the fan blades positioned within the casing. Passage through the casing into the chamber will then be cut-off and the fan blades will be protected against exposure to inclement weather elements.

A further object of the invention is to provide a closable ventilator of a simple, efficient and durable construction which may be made of any suitable material in various sizes.

With these and other objects in view, the invention will be hereinafter more particularly described with reference to the accompanying drawings forming a part of this specification in which similar characters of reference indicate corresponding parts in all the views, and will then be pointed out in the claims at the end of the description.

In the drawings, Figure 1 is a fragmentary view, showing a longitudinal vertical section, partly in detail, taken through one form of closable ventilator embodying my invention when applied to the wall of a building.

Fig. 2 is a fragmentary view showing a rear elevation of the ventilator as shown in Fig. 1.

Fig. 3 is an enlarged fragmentary view, partly in detail, showing the parts of the device for causing the fan plate and blades to slidably move while being revolved, the fan plate being of reduced size.

Fig. 4 is a face view, partly in section, of the parts of the device shown in Fig. 3.

Fig. 5 is a perspective view of a form of sleeve or stop used in the device.

Fig. 6 is a longitudinal section, partly in detail, taken through the clutch element employed in the device, and Fig. 7 is an end view of the clutch element.

The ventilator has a casing 10 which is preferably of a cylindrical tubular form to allow of being tightly fitted in an opening, as 11, provided in the wall, as 12, of a building, mine, ship or elsewhere. One end of the tubular casing serves as an inlet 13 leading from the chamber or compartment, not shown, which is to be freed by ventilation of heat, smoke, steam, gas or acid fumes or other injurious foreign substances, and the other end of the tubular casing serves as an outlet 14 for the discharge of the contaminated atmospheric fluid. Surrounding the outlet 14 of the casing may be an outwardly flared flange 15, and interiorly of the casing are two spaced fixed brackets 16 and 17 having in their central parts alined bearings, as 18 and 19.

Journaled in the bearings of the brackets 16 and 17 is a shaft 20 of a length so that one of its ends protrudes through and beyond the inlet 13 of the casing, while the other end of the shaft protrudes through and beyond the outlet 14 of the casing. The end part of the shaft 20 protruding through the inlet of the casing may be coupled, at 21, to the drive shaft 22 of an electrically driven motor 23, or the shaft may be driven by any other suitable power, and the motor 23 is supported by a bracket, as 24, provided on the casing at its inlet. A large portion of the second end part of the shaft extending through the outlet 14 of the casing is helically grooved, as at 25, and on this grooved end part of the shaft is provided a circular plate 26 which is rotatable as well as being slidably movable on the shaft. The plate 26 is of a diameter to permit it to fit removably in the outlet 14 of the casing 10 for closing the outlet, and on the face of the plate opposed to the outlet and surrounding the shaft 20 are a number of spaced fan blades 27. The fan blades may be of any suitable types, though I preferably employ forms of blades similar to those disclosed in my Patent No. 1,213,955 for suctionally forcing atmospheric fluid when revolved into the inlet 13 and through the casing 10 for discharge through the outlet 14, and these fan blades are of sizes and so arranged that they will be freely admitted in the casing when the plate 26 is closed on the outlet of the casing.

On the plate 26 between the fan blade 27 and surrounding the grooved part of the shaft 20 is a rotatably slidable sleeve or boss 28 having on one of its ends a laterally extending annular flange 29 which abuts against the plate 26. Through the part of the plate 26 as well as through the part of the flange 29 of the boss 28 below the shaft 20 are registered holes in which is held a pin 30 so that one of its ends protrudes beyond the face of the plate opposite to the boss and this protruding end of the pin is cut away to provide a straight edge part, as 31. Also through the part of the plate 26 and through the part of the flange 29 of the boss 28 above the shaft 20 are provided registered holes in which is held a pin 32 so that one of its ends extends from the face of the plate opposite to the boss, and this extending end of the pin 32 is cut away to provide a straight edge part, as 33. The pins 30 and 32 are relatively arranged so that their straight edge parts 31 and 33 are disposed in opposite directions circumferentially of the plate relatively to the circumference of the shaft 20. In the boss 28 of the plate 26 is a threaded recess or opening 34 leading into the interior of the boss, and revolvable in this opening is a ball bearing or guide 35 held against displacement with the boss by a screw 35$^a$ which is threaded in the opening above the ball. The ball 35 is also revolvably seated in the helical groove 25 of the shaft 20 so that when the motor 25 is driven the ball will revolvably move in the groove, and serving to releasably lock the plate 26, fan blades 27 and boss 28 to the shaft for being revolvably driven with the driving of the shaft, a clutch, as 36, is provided.

The clutch 36 may be of any appropriate form though the type illustrated consists of a sleeve 36$^a$ having approximately one-half of the edge of one of its ends cut away, as at 37, to provide at opposite parts of this end of the sleeve two overhanging shoulders or stops 38 and 39. The sleeve 36$^a$ is mounted on the end of the grooved shaft 20 protruding beyond the plate 26 so that the shoulders 38 and 39 are in opposition to the plate 26 whereby the shoulders may be releasably engaged by the straight edge parts 31 and 33 of the pins 30 and 32 which extend from the plate 26. The sleeve 36$^a$ is keyed, at 40, to the shaft 20 so that when the shaft is driven the sleeve will also revolve. Interiorly of the sleeve 36$^a$ of the clutch and encircling the shaft 20 is a cushion element 41 preferably in the form of a spiral spring tensioned for serving to force the plate 26, fan blades 27 and boss 28 to slidably move on the shaft in a direction from the sleeve 36$^a$ of the clutch 36 when the rotation of the shaft 20 is stopped.

When the motor 23 is operated the grooved shaft 20 will be driven, and assuming that the plate 26 is closed on the outlet 14 of the casing 10 with the fan blades 27 disposed within the casing, the plate 26, fan blades 27 and boss 28 will be revolved by the shaft. The guide or ball 35 carried by the boss will revolvably travel in the groove 25 of the shaft, and the plate 26, fan blades 27 and boss 28 will slidably move on the shaft to open positions from the outlet 14 of the casing 10. The straight edge parts 31 and 33 of the pins 30 and 32 will then engage the shoulders 38 and 39 of the sleeve 36$^a$ of the clutch element 36 for holding the plate 26, fan blades 27 and boss 28 so that they will be revolved by the shaft 20 to cause the fan blades to suctionally force atmospheric fluid through the casing and through the outlet 14. With the engagement of the pins 30 and 32 with the clutch 36 the cushion element or spring 41 will be tensioned by being compressed by the plate 26, and with the stopping of rotation of the shaft 20 by cutting off the power of the motor 23 the tension of the spring will cause reverse rotary slidable movement of the plate 26, fan blades 27 and boss 28 on the shaft so that the plate will close upon the outlet 14 of the casing with the fan blades being disposed within the casing. Rain, snow and wind will then be prevented from passing through the casing 10, and the fan blades will not be exposed to inclement weather conditions when the device is not in use. In order to limit the movement of the boss 28, plate 26 and fan blades 27 inwardly of the casing 10, on the shaft 20 is keyed, at 42, a sleeve, as 43, which is arranged on part of the shaft 20 so that the boss 28 will abut thereagainst when the fan blades have moved within the casing and the plate 26 has moved a distance to properly close the outlet of the casing.

In the foregoing description, I have embodied the preferred form of my invention, but I do not wish it to be understood as limiting myself thereto, as I am aware that modifications may be made therein without departing from the principle or sacrificing any of the advantages of this invention, therefore I reserve to myself the right to make such changes as fairly fall within the scope of the claims thereof.

Having thus described my invention, I claim as new and desire to secure by Letters Patent:—

1. A ventilator, comprising a casing having an inlet and an outlet, and a power driven plate carrying fan blades rotatably mounted in the casing at its outlet, the plate being of a size adapted to close the inlet of the casing and the fan blades being adapted to suctionally force atmospheric fluid through the casing from its inlet for discharge through its outlet as well as being of sizes and arrangement to pass within the casing, said plate and fan blades also being slidably movable so that when driven the plate will move to open position from the outlet of the casing and so that with the shutting-off of the power to stop their rotation the plate and blades will move so that the plate closes the outlet of the casing with the fan blades positioned interiorly of the casing.

2. A ventilator, comprising a casing having an inlet and an outlet, and fan blades rotatably mounted in the casing at its outlet and the fan blades being adapted to suctionally force atmospheric fluid through the casing from its inlet for discharge through its outlet as well as being of sizes and being arranged to pass within the casing, said fan blades also being slidably movable so that when driven the blades will move to open position from the outlet of the casing and so that with the shutting-off of the power to stop their rotation the blades will move interiorly of the casing.

3. A ventilator, comprising a casing having an inlet and an outlet, a power driven plate carrying fan blades rotatably mounted in the casing at its outlet, the plate being of a size adapted to close the inlet of the casing and the fan blades being adapted to suctionally force atmospheric fluid through the casing from its inlet for discharge through its outlet as well as being of sizes and being arranged to pass within the casing, said plate and fan blades also being slidably movable so that when driven the plate will move to open position from the outlet of the casing, and means associated with the plate for releasably locking the plate to allow of rotation when moved to open position from the outlet of the casing.

4. A ventilator, comprising a casing having an inlet and an outlet, a power driven shaft journaled in the casing so that one of its ends protrudes beyond the outlet of the casing, a rotatably slidable plate on the shaft at the outlet of the casing, and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, and means associated with the shaft for guiding the movements of the plate and fan blades to open positions from the outlet of the casing with the rotation of the shaft.

5. A ventilator, comprising a casing having an inlet and an outlet, a power driven shaft journaled in the casing so that one of its ends protrudes beyond the outlet of the casing, a rotatably slidable plate on the shaft at the outlet of the casing, and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, and a revolvable guide element associated with the shaft for guiding the movement of the plate and fan blades to open positions from the outlet of the casing with the rotation of the shaft.

6. A ventilator, comprising a casing having an inlet and an outlet, a power driven spirally grooved shaft journaled in the casing so that one of its ends protrudes beyond the outlet of the casing, a rotatably slidable plate on the shaft at the outlet of the casing, and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, and a ball carried by the plate, revolvable in the groove of the shaft for guiding the movement of the plate and fan blades to open positions from the outlet of the casing with the rotation of the shaft.

7. A ventilator, comprising a casing having an inlet and an outlet, a power driven shaft journaled in the casing so that one of its ends protrudes beyond the outlet of the casing, a rotatably slidable plate on the shaft at the outlet of the casing and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, means associated with the plate and shaft for guiding the movement of the plate and fan blades to open positions from the outlet of the casing with the rotation of the shaft, and a clutch on the shaft, adapted to releasably lock the plate and shaft together when the plate is in open position from the outlet of the casing so that the plate and fan blades will revolve with the driving of the shaft.

8. A ventilator, comprising a casing having an inlet and an outlet, a power driven shaft journaled in the casing so that one of its ends protrudes beyond the outlet of the casing, a rotatable slidable plate on the shaft at the outlet of the casing and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, a revolvable guide element associated with the plate and shaft for guiding the movement of the plate and fan blades to open positions from the outlet of the casing with the rotation of the shaft, and a clutch on the shaft, adapted to releasably lock the plate and shaft together when the plate is in open position from the outlet of the casing so that the plate and fan blades will revolve with the driving of the shaft.

9. A ventilator, comprising a casing having an inlet and an outlet, a power driven spirally grooved shaft journaled in the casing so that one of its ends protrudes beyond the outlet of the casing, a rotatably slidable plate on the shaft at the outlet of the casing, and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, a ball carried by the plate, revolvable in the groove of the shaft for guiding the movement of the plate and fan blades to open positions from the outlet of the casing with the rotation of the shaft, and a clutch on the shaft, adapted to releasably lock the plate and shaft together when the plate is in open position from the outlet of the casing so that the plate and fan blades will revolve with the driving of the shaft.

10. A ventilator, comprising a casing having an inlet and an outlet, a power driven shaft journaled in the casing so that one of its ends protrudes beyond the outlet of the casing, a rotatably slidable plate on the shaft at the outlet of the casing, and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, a guide associated with the plate and shaft for guiding the movement of the plate and fan blades to open positions from the outlet of the casing with the rotation of the shaft, a sleeve held on the shaft, and means associated with the sleeve and plate to releasably lock the plate and shaft together when the plate is in open position from the outlet of the casing so that the plate and fan blades will revolve with the driving of the shaft.

11. A ventilator, comprising a casing having an inlet and an outlet, a power driven shaft journaled in the casing so that one of its ends protrudes beyond the outlet of the casing, a rotatably slidable plate on the shaft at the outlet of the casing, and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, a guide associated with the plate and shaft for guiding the movement of the plate and fan blades to open positions from the outlet of the casing with the rotation of the shaft, a clutch on the shaft, adapted to releasably lock the plate and shaft together when the plate is in open position from the outlet of the casing so that the plate and fan blades will revolve with the driving of the shaft, and a cushion element associated with the clutch, adapted to be tensioned by compression when the plate and clutch are in locked engagement and also adapted when the rotation of the shaft is stopped to release the plate from the clutch as well as causing the plate to reversely slide on the shaft to close the outlet of the casing with the fan blades positioned interiorly of the casing.

12. A ventilator, comprising a casing having an inlet and an outlet, a power driven shaft journaled in the casing so that one of its ends protrudes beyond the outlet of the casing, a rotatably slidable plate on the shaft at the outlet of the casing, and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, a guide associated with the plate and shaft for guiding the movement of the plate and fan blades to open positions from the outlet of the casing with the rotation of the shaft, a clutch on the shaft, adapted to releasably lock the plate and shaft together when the plate is in open position from the outlet of the casing so that the plate and fan blades will revolve with the driving of the shaft, a cushion element associated with the clutch, adapted to be tensioned by compression when the plate and clutch are in locked engagement and also adapted when the rotation of the shaft is stopped to release the plate from the clutch as well as causing the plate to reversely slide on the shaft to close the outlet of the casing with the fan blades positioned interiorly of the casing, and a stop on the shaft to limit the movements of the plate and fan blades inwardly of the casing.

13. A ventilator, comprising a casing having an inlet and an outlet, a power driven spirally grooved shaft journaled in the casing so that one of its ends protrudes beyond the outlet of the casing, a rotatably slidable plate on the shaft at the outlet of the casing, and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, a ball carried by the plate, revolvable in the groove of the shaft for guiding the movement of the plate and fan blades to open positions from the outlet of the casing with the rotation of the shaft, a clutch on the shaft, adapted to releasably lock the plate and shaft together when the plate is in open position from the outlet of the casing so that the plate and fan blades will revolve with the driving of the shaft, and a spring element associated with the clutch, adapted to be tensioned by compression when the plate and clutch are in locked engagement and also adapted when the rotation of the shaft is stopped to release the plate from the clutch as well as causing the plate to reversely slide on the shaft to close the outlet of the casing with the fan blades positioned interiorly of the casing.

14. A ventilator, comprising a casing having an inlet and an outlet, a power driven spirally grooved shaft journaled in the casing so that one of its ends protrudes beyond the outlet of the casing, a rotatably slidable plate on the shaft at the outlet of the casing, and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, a ball carried by the plate, revolvable in the groove of the shaft for guiding the movement of the plate and fan blades to open positions from the outlet of the casing, with the rotation of the shaft, a clutch on the shaft, adapted to releasably lock the plate and shaft together when the plate is in open position from the outlet of the casing so that the plate and fan blades will revolve with the driving of the shaft, a spring element associated with the clutch, adapted to be tensioned by compression when the plate and clutch are in locked engagement and also adapted when the rotation of the shaft is stopped to release the plate from the clutch as well as causing the plate to reversely slide on the shaft to close the outlet of the casing with the fan blades positioned interiorly of the casing, and a stop on the shaft to limit the movements of the plate and fan blades inwardly of the casing.

15. A ventilator, comprising a casing having an inlet and an outlet, a power driven spirally grooved shaft journaled in the casing so that one of its ends protrudes beyond the outlet of the casing, a rotatably slidable plate on the shaft at the outlet of the casing, and the plate being of a size to close and open the outlet of the casing, fan blades held on the face of the plate in opposition to the outlet of the casing, the fan blades being adapted to suctionally force atmospheric fluid through the casing for discharge from its outlet and the blades being of sizes and in arrangement to pass interiorly of the casing, a ball carried by the plate, revolvable in the groove of the shaft for guiding the movement of the plate and fan blades to open positions from the outlet of the casing with the rotation of the shaft, a sleeve held on the shaft, locking means associated with the sleeve and plate to releasably lock the plate and shaft together when the plate is in open position from the outlet of the casing so that the plate and fan blades will revolve with the driving of the shaft, a spring element associated with the sleeve, adapted to be tensioned by compression when the plate and clutch are in locked engagement and also adapted when the rotation of the shaft is stopped to release the plate from the clutch as well as causing the plate to reversely slide on the shaft to close the outlet of the casing with the fan blades positioned interiorly of the casing, and a stop on the shaft to limit the movements of the plate and fan blades inwardly of the casing.

This specification signed and witnessed this 14' day of September A. D. 1920.

ADOLPH F. ROTH.

Witnesses:
J. FRANK,
J. FREDERICK CRYER.